US012550889B2

(12) United States Patent
Messer et al.

(10) Patent No.: US 12,550,889 B2
(45) Date of Patent: Feb. 17, 2026

(54) ORGAN PERFUSION SYSTEM AND METHOD

(71) Applicant: Royal Papworth Hospital NHS Foundation Trust, Cambridge (GB)

(72) Inventors: Simon Messer, Cambridge (GB); Pedro Catarino, Cambridge (GB); Stephen Large, Cambridge (GB)

(73) Assignee: Royal Papworth Hospital NHS Foundation Trust, Cambridge (GB)

( * ) Notice: Subject to any disclaimer, the term of this patent is extended or adjusted under 35 U.S.C. 154(b) by 936 days.

(21) Appl. No.: 17/761,074

(22) PCT Filed: May 29, 2020

(86) PCT No.: PCT/EP2020/065011
§ 371 (c)(1),
(2) Date: Mar. 16, 2022

(87) PCT Pub. No.: WO2021/058144
PCT Pub. Date: Apr. 1, 2021

(65) Prior Publication Data
US 2022/0346368 A1    Nov. 3, 2022

(30) Foreign Application Priority Data

Sep. 23, 2019  (GB) ..................... 1913691

(51) Int. Cl.
*A01N 1/02*       (2006.01)
*A01N 1/143*      (2025.01)
(52) U.S. Cl.
CPC .................... *A01N 1/143* (2025.01)
(58) Field of Classification Search
None
See application file for complete search history.

(56) References Cited

U.S. PATENT DOCUMENTS 5,765,568 A * 6/1998 Sweezer, Jr. ........ A61M 25/1011
604/509
6,046,046 A * 4/2000 Hassanein ................ A01N 1/10
435/284.1
2007/0275364 A1 * 11/2007 Hassanein ................ A01N 1/10
435/284.1
2012/0116152 A1   5/2012 Faulkner
2014/0272920 A1   9/2014 Potenziano et al.
2017/0049096 A1 * 2/2017 Kay ....................... A01N 1/122

FOREIGN PATENT DOCUMENTS

| AU | 2015246083 A1 | 11/2015 | |
| EP | 1768490 B1 | 9/2010 | |
| WO | WO-2006/042138 A2 | 4/2006 | |
| WO | WO-2006/118990 A2 | 11/2006 | |
| WO | WO-2011037511 A1 * | 3/2011 | ........... A01N 1/0226 |
| WO | WO-2012/027787 A1 | 3/2012 | |
| WO | WO-2014/194349 A1 | 12/2014 | |

OTHER PUBLICATIONS

United Kingdom Intellectual Property Office Search Report, Application No. GB-1913691.0, dated Jan. 17, 2020, 3 pages.
International Search Report and Written Opinion, International Application No. PCT/EO2020/065011, International Search Authority—European Patent Office, mailed Aug. 28, 2020, 12 pages.
Christopher W. White et al., "Assessment of donor heart viability during ex vivo heart perfusion", Canadian Journal of Physiology and Pharmacology, vol. 93, No. 10, May 1, 2015.

* cited by examiner

*Primary Examiner* — Nghi V Nguyen
(74) *Attorney, Agent, or Firm* — Quarles & Brady, LLP (57) ABSTRACT

An organ perfusion system (100) for extracorporeal perfusion of a heart (1) includes an organ chamber (15) having an aortic connector (17), and a first fluid flow path (19) comprising a pump interface (23) and an oxygenator (25), the aortic connector being fluidly connected to the first fluid flow path. The system is adapted for use in a method, wherein oxygenated perfusate is flowed into the heart via the aorta and desoxygenated perfusate is allowed to exit the heart via the inferior vena cava and/or the superior vena cava to thereby perfuse the heart in a substantially unloaded state. Such method may allow for improved recovery of the heart tissue during perfusion. The organ perfusion system may further comprise a perfusate reservoir (27) and/or a chassis, wherein the organ chamber is pivotable with respect to the chassis for holding the heart in a tilted position or to allow rotation of the organ chamber in a horizontal plane.

9 Claims, 6 Drawing Sheets

ORGAN PERFUSION SYSTEM AND METHOD

RELATED APPLICATIONS

This application is a 35 U.S.C. § 371 national phase application of PCT/EP2020/065011 (WO-2021/058144-A1), filed on May 29, 2020, entitled "ORGAN PERFUSION SYSTEM AND METHOD," which application claims the benefit of GB-1913691.0 filed Sep. 23, 2019, both of which are incorporated herein by reference in its entirety.

FIELD OF THE INVENTION

The present invention relates to perfusion of organs, in particular the extracorporeal perfusion of organs, and more particularly, although not exclusively, to a system and method for the extracorporeal perfusion of a heart, such as a human heart.

BACKGROUND

Heart transplantation remains the gold standard treatment for the management of end stage drug refractory heart failure. The median survival for recipients who undergo heart transplantation is 14 years with an excellent quality of life. Unfortunately demand for heart transplantation far outstrips supply as the main limiting factor remains the number of suitable available donor hearts from donation after brain death (DBD) donors. Within the United Kingdom the number of patients on the heart transplant waiting list is increasing over time, with many patients waiting for a suitable heart transplant either dying or become too sick to undergo heart transplantation whilst waiting fora suitable DBD heart.

Recently, following extensive research by surgeons at Royal Papworth Hospital (UK), heart transplantation from donation after circulatory death (DCD) donors has emerged as an additional source of donor hearts for transplantation with excellent outcomes. DCD donor heart transplantation was neglected for decades as it was presumed that these hearts would be unsuitable for transplantations due to the extensive warm ischaemic period associated with declaration of circulatory death.

Currently the universally adopted method of cold storage during transportation used for DBD hearts is not suitable for DCD heart transplantation as levels of cell adenosine triphosphate/adenosine diphosphate (ATP/ADP) need to be replenished as these are significantly depleted during circulatory death. Machine perfusion of DCD hearts has been shown to restore ATP/ADP levels. Therefore, machine perfusion is necessary to support viability and function of the DCD organ and allow for organ preservation and repair prior to transplantation.

Various apparatus for the extracorporeal perfusion of organs, in particular hearts, are known in the art. For example, EP 1768490 B1 describes systems, methods and devices for extracorporeal heart perfusion at physiologic or near-physiologic conditions. A system is disclosed comprising a disposable single-use unit, and a non-disposable multi-use unit. The single use disposable unit comprises an organ chamber assembly for containing a heart during perfusion and including: an interface for connecting to a pulmonary vein of the heart and an interface for connecting to an aorta of the heart, and wherein the system comprises a pump interface for receiving a pumping force from a pump and for translating the pumping force to perfusion fluid to pump the perfusion fluid to the organ chamber assembly. The system uses a pulsatile (diaphragmatic) pump in combination with a compliance chamber to provide a pulsatile fluid flow in which pressure peaks are regulated by the presence of the compliance chamber.

The system disclosed in EP 1768490 B1 is operable in two different modes of operation: (1) a normal flow mode, in which the system circulates the perfusion fluid to the heart in the same manner as blood would circulate in the human body (i.e. with loaded left and right ventricles), by supplying perfusion fluid via the pulmonary vein to the left atrium of the heart, and wherein the perfusion fluid is flowed away from the right ventricle via the pulmonary artery and away from the left ventricle via the aorta; and (2) a retrograde flow mode, in which the system flows the perfusion fluid into the heart via the aorta, through coronary microvasculature and into the coronary sinus and out of the right ventricle of the heart via the pulmonary artery. In this retrograde flow mode, the right ventricle remained loaded and pumps the perfusion fluid through the system to the downstream oxygenator. The left ventricle is unloaded, and has only a trickle flow, which is vented directly into the organ chamber.

The present invention has been devised in view of limitations of presently-known systems.

SUMMARY OF THE INVENTION

Accordingly, in a first aspect, the present invention provides a method of extracorporeal perfusion of a heart, the method comprising steps of:
providing a heart perfusion system comprising an organ chamber having an aortic connector, and a first fluid flow path comprising a pump interface and an oxygenator, the aortic connector being fluidly connected to the first fluid flow path;
placing the heart within the organ chamber and attaching an aorta of the heart to the aortic connector;
providing a pump to transfer pumping force to the pump interface to pump venous perfusate within the first fluid flow path via the oxygenator to thereby provide subsequent flow of oxygenated perfusate to the heart via the aortic connector; and
allowing perfusate to exit the heart via one or more of the inferior vena cava and the superior vena cava to thereby perfuse the heart in a substantially unloaded state.

The term 'unloaded state' is used herein to define a state in which both the right and left sides (right atrium/ventricle and left atrium/ventricle respectively) of the heart are unloaded. In an unloaded state, the heart is preferably beating, but with reduced power expenditure due to a reduced or eliminated pumping load. In other words, both of the right and left ventricles are operating at a state well below normal workload. When the heart is perfused in an unloaded state, the myocardial oxygen consumption is decreased in comparison to a heart perfused in a partially loaded or fully loaded state. Accordingly, the degree of unloading can be measured qualitatively by measurement of the oxygen consumption (MVO2), MVO2 being a direct measure of the total energy consumption of the heart. It is theorised that perfusion of the heart in an unloaded state may allow for improved recovery of the heart tissue during perfusion.

In the method according to the present invention, this unloaded state is achieved by flowing perfusate into the coronary arteries of the heart via the aorta and allowing perfusate to exit the heart via one or more of the inferior vena cava (IVC) and the superior vena cava (SVC). The right ventricle remains substantially unloaded as perfusate flows out of the right atrium via the IVC and/or SVC. The left ventricle remains substantially unloaded as the closed aortic valve prevents significant flow of perfusate into the ventricle and there is no perfusate entering the left side of the heart. Furthermore, the perfusion system is configured such that the system is not reliant on normal loading of one or more of the ventricles of heart to thereby pump venous perfusate to the oxygenator. This is in contrast to known systems which are commonly dependent on loading of at least the right ventricle of the heart to thereby provide pumping of perfusate to an oxygenator. However in the method and system according to the present invention, a pump is provided and arranged to transfer pumping force to the pump interface (which may alternatively be referred to as a pump head) of a first fluid flow path of a heart perfusion system, so that venous (deoxygenated or partially deoxygenated) perfusate is pumped within the first fluid path via an oxygenator to thereby provide subsequent flow of oxygenated perfusate to the heart via the aortic connector.

Perfusate may be allowed to exit the heart via one or more of the inferior vena cava (IVC) and the superior vena cava (SVC) e.g. by leaving one or both of the inferior vena cava and the superior vena cava unsutured during perfusion, or, alternatively, by providing an IVC or SVC venting arrangement. Preferably both the inferior vena cava and the superior vena cava are left unsutured during perfusion. In this way, deoxygenated perfusate flowing into the right atrium via the coronary sinus after perfusion of the heart muscle via coronary vasculature can drain directly from the right atrium via the IVC or SVC.

According there is significantly reduced flow into the right ventricle during perfusion in comparison to known perfusion arrangements. Preferably perfusate is also allowed to exit the heart via the pulmonary artery to thereby allow perfusate entering the right ventricle to drain from the heart. The pulmonary artery may therefore also be left unsutured during perfusion. Alternatively a right ventricle venting arrangement may be provided. Preferably, perfusate exiting the heart via the IVC and/or the SVC is allowed to vent direct into the organ chamber of the heart perfusion system. In this way it is not necessary to provide complicated venting arrangements for directing perfusate. Perfusate vented from the right side of the heart including from the right atrium and/or the right ventricle may therefore be vented directly into e.g. an organ chamber of the heart perfusion system.

In a second aspect, the present invention provides a heart perfusion system suitable for use in the method of extracorporeal perfusion of a heart of the first aspect of the invention. The system comprises an organ chamber having an aortic connector for connection to an aorta of the heart, the aortic connector being fluidly connected to a first fluid flow path comprising a pump interface and an oxygenator;

wherein the pump interface is arranged to, in use, transfer a pumping force from a pump to pump venous perfusate via the oxygenator to thereby provide subsequent flow of oxygenated perfusate to the heart via the aortic connector of the organ chamber.

The organ chamber may comprise a housing and a lid. The housing may include a bottom or floor and one or more walls for containing the heart, and an opening via which the heart may be disposed within the housing. When shut, the lid may cover substantially the entire opening of the housing. This can help to prevent contamination of the heart during perfusion. In some arrangements the lid may be transparent to allow observation of the heart during perfusion. The organ chamber comprises an aortic connector for connection to an aorta of the heart, the aortic connector being fluidly connected to the first fluid flow path. In this way, the aortic connector may be considered to be an inlet into the organ chamber from the first fluid flow path. The organ chamber may further comprise an outlet to the first fluid flow path, such that the organ chamber forms a part of the first fluid flow path. The inlet (aortic connector) and outlet of the organ chamber may be disposed at opposite ends of the organ chamber.

The size and shape of the organ chamber is not particularly limited, other than to the extent that it must be suitable for containing a heart during use. Accordingly, in some exemplary arrangements, the organ chamber may have a length of approximately 300-400 mm, a width of approximately 200-300 mm and a depth of approximately 200-300 mm. The material from which the organ chamber is formed is not particularly limited, but preferably should be a material which is contact-biocompatible, i.e. wherein contact with the material of the chamber will not adversely affect a heart held in the organ chamber. The organ chamber may be formed by any suitable manufacturing method, for example, moulding, casting, additive manufacturing (3D printing) or any other suitable method.

In use, a heart is positioned in the organ chamber and fluidly connected to the first fluid flow path of the heart perfusion system by connection of an aorta of the heart to the aortic connector of the organ chamber. Preferably the aortic connector comprises at least one attachment point for attachment of sutures, more preferably a plurality of such attachment points. For example, the aortic connector may comprise one or more through-holes formed in the aortic connector. The attachment points may be provided on a collar portion of the aortic connector. Alternatively or additionally the aortic connector may comprise one or more projections to which sutures may be affixed. In this way it may be possible to attach an aorta of the heart to the aortic connector by attachment of sutures passing through the aorta to the one or more attachment points of the aortic connector. This can help to prevent the heart from falling off of the aortic connector during perfusion. In some arrangements, the aortic connector may comprise a plurality of attachment points disposed at approximately equal intervals about a circumference of the aortic connector, whereby a heart can be attached to the connector by sutures disposed at approximately equal intervals about the aorta of the heart. This can provide for more even distribution of force about the circumference of the aorta of the heart when attached to the aortic connector.

In addition to being fluidly connected to the organ chamber, the first fluid flow path comprises at least a pump interface and an oxygenator. The pump interface is arranged to, in use, transfer a pumping force from a pump to pump perfusate within the first fluid flow path. The pump may be any suitable pump, for example a centrifugal pump or a positive displacement pump (reciprocating pump, diaphragmatic pump, rotary pump, screw pump, gear pump etc.). However, in preferred embodiments, the pump is a centrifugal pump. Where the pump is a centrifugal pump, the pump interface may comprise a housing containing a rotor portion (impeller) of the centrifugal pump. The rotor portion of the centrifugal pump is preferably magnetically driven. In other word preferably the rotor portion is not shaft-driven. In this way, the pump interface can comprise a sealed module. This can help to prevent contamination of the perfusate, or, conversely, contamination of the stator portion of the pump. A centrifugal pump may require a smaller priming volume than many positive displacement type pumps, which may be convenient for use in e.g. perfusion of paediatric hearts. The pump should be operable to transfer pumping force to the pump interface to pump perfusate at an appropriate fluid pressure, for example at a pressure of 150 mmHg or less, preferably between about 30 and 100 mmHg. The pump may be operable to pump perfusate at a flow rate of between about 75 ml/min to about 5000 ml/min, for example a flow rate of: 100 ml/min or more; 200 ml/min or more; 500 ml/min; or 1000 ml/min or more; up to: 1300 ml/min or less; 1200 ml/min or less; 1000 ml/min or less; 800 ml/min or less; or 500 ml/min or less. Typically, for an adult heart being perfused, the flow rate may be around 1100 ml/min. For a paediatric heart, the flow rate may be around 200-300 ml/min, depending on the weight of the donor.

In the most preferred arrangements, the pump may be a centrifugal pump operable to drive an impeller portion of the pump interface to pump perfusate at a constant pressure of between about 30 and 100 mmHg, more preferably at a pressure of between about 40 mmHg and 80 mmHg. By providing a pump which is able to pump fluid at these pressures it may be possible to reduce or prevent oedema (an excess build-up of fluid) in the heart tissue. Furthermore, by pumping at a constant pressure it is possible to avoid pressure spikes which may further reduce the likelihood of oedema of the heart tissue. In preferred arrangements, the pump interface is part of a single use disposable module The oxygenator is located downstream of the pump interface on the first fluid flow path with respect to the fluid flow direction, such that, during use, venous (deoxygenated or partially deoxygenated) perfusate is pumped by the pump interface to the oxygenator. The oxygenator is located upstream of the aortic connector on the first fluid flow path with respect to the fluid flow direction, such that, during use, oxygenated perfusate is supplied to the aorta of heart via the aortic connector.

The oxygenator may be a standard, commercially-available oxygenator. For example, one kind of suitable oxygenator is a Xenios Hilite® oxygenator. The oxygenator may be arranged to receive a flow of gas from an external or on-board gas source, for example from one or more gas storage bottles. The gas composition used for oxygenating the perfusion fluid may be selected from a wide range of suitable gases or gas mixtures comprising oxygen. However one particularly suitable gas composition comprises about 95% medical air (which has substantially the same composition as atmospheric air: Oxygen 21%, Nitrogen 79%) and about 5% carbon dioxide ($CO_2$). Another suitable gas mix comprises about 95% oxygen, and 5% $CO_2$. There may be a gas regulator configured to control the flow of gas from the gas source to the oxygenator. The gas regulator may be controllable by an operator, whereby the operator can adjust the gas flow to the oxygenator during use.

Preferably the first fluid flow path comprises a perfusate reservoir for holding a volume of perfusate. The volume of the reservoir is not particularly limited but may be configured to hold a reservoir volume of between 200 ml and 2000 ml of perfusate, preferably between 500 ml and 1000 ml of perfusate. The reservoir may have a maximum capacity of e.g. 2000 ml, 1500 ml or 1000 ml. The reservoir may have a minimum capacity of e.g. 200 ml, 300 ml, 400 ml or 500 ml. Preferably the perfusate reservoir is located intermediate the organ chamber and the pump interface on the first fluid flow path. In this way a constant flow of perfusate from the reservoir can be provided.

One or more sampling points may be provided along the first fluid flow path. For example one or more ports may be provided through which samples of perfusate may be removed during perfusion (e.g. for testing of the perfusate.

Preferably the heart perfusion system comprises temperature regulation means arranged to regulate the temperature of perfusate within the first fluid flow path. The temperature regulation means may be operable to maintain perfusate within the first fluid flow path at a temperature of between about 4° C. and about 34° C., more preferably at a temperature of between about 32° C. and about 34° C. Maintaining the perfusate at a temperature below about 34° C. can reduce the metabolic rate of the heart, thereby allowing the organ to be preserved ex-vivo for a longer period of time. Accordingly in some methods, the perfusate may be maintained at a temperature of less than 34° C., less than 32° C., less than 30° C., less than 25° C., or less than 20° C.

The temperature regulation means may comprise e.g. a heater and/or a heat exchanger. In some arrangements, the temperature regulation means may be operable to regulate the temperature of the perfusate as the perfusate passes through the oxygenator. For example, in one particular convenient arrangement, a heat exchanger is provided which is operable to regulate the temperature of perfusate within the oxygenator (for example, a jacket may be fitted around the oxygenator, and a heated/cooled fluid passed through the jacket).

Preferably, the heart perfusion system comprises a left ventricle venting arrangement configured to, in use, vent perfusate from the left ventricle of the heart. During perfusion of the heart the heart will typically beat, thereby ejecting perfusate contained in the left ventricle via the left ventricle venting arrangement. Venting the left ventricle can help to prevent distention and/or injury of the left ventricle during perfusion. The left ventricle venting arrangement may comprise one or more ducts configured to be located in the left ventricle of the heart during perfusion. The manner in which the duct is located in the left ventricle is not particularly limited. For example, the duct may be disposed so as to pass through the apex of the left ventricle. Alternatively, the duct may be disposed so as to pass through the left atrial appendage into the left ventricle via the mitral valve. Alternatively, the duct may be disposed so as to pass through the left atrium wall and into the left ventricle via the mitral valve. In preferred embodiments, the left ventricle venting arrangement may comprise a duct having a plurality of perforations along the length of the duct to thereby allow perfusate to enter the duct at multiple locations. This can help to ensure more complete venting of the left ventricle. The left ventricle venting arrangement may be configured to direct the perfusate vented from the left ventricle to a perfusate reservoir of the heart perfusion system. Preferably, perfusate vented from the left ventricle is not vented directly into the organ chamber. In other words, the left ventricle venting arrangement may be arranged to bypass an outlet of the organ chamber. In this way, it is possible to provide a different flow path for perfusate vented from the left side (left atrium and left ventricle) of the heart, which will typically be oxygenated perfusate, as compared with perfusate exiting from the right side (right atrium and right ventricle) of the heart, which will typically be venous or deoxygenated perfusate, and which is conveniently vented to the organ chamber. This may be advantageous as it can allow for more accurate measurement of myocardial oxygen consumption as compared to arrangements where perfusate vented from both sides of the heart is vented to the same location (for example the organ chamber), because venous perfusate vented from the right side of the heart will not be contaminated with oxygenated perfusate vented from the left side of the heart.

The heart perfusion system may also comprise one or more sensors, for example the system may include: one or more pressure sensors configured to measure a fluid pressure of the perfusate; one or more temperature sensors configured to measure a temperature of the perfusate; one or more flow rate sensors configured to measure a flow rate of the perfusate; one or more oxygen saturation sensors configured to measure an oxygen saturation of the perfusate; and/or one or more haematocrit sensors configured to measure a ratio of the volume of red blood cells to the total volume of perfusate. The location of such sensors is not particularly limited.

In some arrangements a pressure sensor and/or a flow sensor may be provided in or adjacent to the aortic connector on the first fluid flow path so that the pressure and/or flow rate of perfusate entering the aorta of a heart connected to the aortic connector can be measured. Where both a pressure sensor and a flow sensor are provided, vascular resistance of the heart can be measured by dividing the pressure measured at this point (the aortic pressure) by the flow rate of perfusate into the aorta. Accordingly methods according to the invention may comprise a step of calculating a vascular resistance (mmHg·min/l) of the heart being perfused. It may be advantageous to monitor the vascular resistance as a high vascular resistance may indicate vasoconstriction of the vascular endothelium, which may be in itself an indication of poor transplant performance.

Alternatively or additionally, in some arrangements there may be provided a first oxygen saturation sensor arranged to measure oxygen saturation of oxygenated perfusate entering the aorta of the heart, and a second oxygen saturation sensor arranged to measure oxygen saturation of venous perfusate exiting the right side (right atrium and/or right ventricle) of the heart. The location of such sensors is not particularly limited, however conveniently the first oxygen saturation sensor may be positioned at an inlet to the organ chamber, e.g. in or adjacent the aortic connector. The second oxygen saturation sensor may be positioned e.g. at an outlet of the organ chamber. With such an arrangement, the myocardial oxygen consumption of the heart can be calculated by comparing the output of the first and second oxygen saturation sensors. Accordingly methods according to the invention may comprise a step of calculating a myocardial oxygen consumption of the heart being perfused.

The system may further comprise one or more monitors for displaying output information of one or more sensors of the heart perfusion system. This can assist an operator in monitoring operation of the system during perfusion.

The heart perfusion system may comprise a chassis. The chassis may comprise a frame structure to which other components of the heart perfusion system may be attached. The chassis may be portable, for example by means of handles. In preferred arrangements, the chassis may comprise one or more handles attached at opposite ends of a frame structure of the chassis. The chassis may be supported on a wheeled base for ease of transportation.

The heart perfusion system may have at least two dimensions (height, width and/or length) which are less than about 70 cm, more preferably less than 60 cm, most preferably less than 55 cm. In this way, it may be possible to position the heart perfusion system within a standard-sized CT machine, which typically have a bore dimeter of 70 cm or less, occasionally 60 cm or less or 55 cm or less. By providing a system which can be placed inside a standard CT scanner, it may be possible to allow a heart being perfused using the heart perfusion system to be scanned e.g. to obtain an ex-vivo CT coronary angiogram of the heart.

Preferably the organ chamber is pivotable with respect to a chassis of the heart perfusion system. In some arrangements, the organ chamber may be pivotable with respect to the chassis to thereby allow movement of the organ chamber between a first position, in which the organ chamber is configured to hold a heart in a substantially horizontal position, and a second position in which the organ chamber is configured to hold a heart in tilted position. A first position in which the organ chamber is configured to hold a heart in a substantially horizontal position may alternatively be referred to as a transportation position. In this position, the weight of the heart may be substantially supported by a floor of the organ chamber. This can allow for a lower force on the aorta of the heart at the point of attachment to the aortic connector than when the heart is supported in a non-horizontal position. According when a heart is transported in a substantially horizontal position it may reduce the risk of the heart becoming unattached from the aortic connector of the organ chamber during transportation. A second position in which the organ chamber is configured to hold the heart in a tilted position may alternatively be referred to as a de-airing position. It may be advantageous to hold the heart in a tilted position during perfusion to allow for easier removal of air from the vasculature of the heart. Furthermore, holding the heart in a tilted position may allow for easier access to the heart during perfusion. A tilted position is herein used to define a position which is substantially non-horizontal. For example, the organ chamber may be configured to hold the heart at an angle of between about 10° and 45° with respect to the first position. For example, the second position may be at an angle of 10° or more, 20° or more, 30° or more, 40° or more, or 45° or more from horizontal. This pivotability may be provided by attaching the organ chamber to the chassis via at least one pivotable hinge or other pivotable attachment member.

In some arrangements the organ chamber may alternatively or additionally be pivotable with respect to the chassis to thereby allow rotation of the organ chamber in a horizontal plane with respect to the chassis. Preferably the organ chamber may be rotatable in a horizontal plane by up to and including 90° with respect to the chassis, more preferably by up to and including 180° with respect to the chassis. For example the organ chamber may be held by a rotatable organ chamber support member. In preferred arrangements, the organ chamber support member may be rotatable by being disposed on a platform rotatably fixed to the chassis. In this way, other components of the heart perfusion system may also be disposed on the rotatable platform to thereby allow simultaneous rotation of multiple components of the heart perfusion system. This can help to avoid entanglement of different components of the heart perfusion system (for example ducting) during rotation of the organ chamber. Allowing the organ chamber to be rotatable in a horizontal plane by at least 90° with respect to the chassis may be particularly advantageous for e.g. performing CT coronary angiography of a heart being perfused in the heart perfusion system, because it is possible to obtain different views of the heart without removing the heart perfusion system from the CT machine.

There may be a locking member provided to lock the organ chamber at a discrete number of different positions with respect to the chassis. For example the locking member may be arranged to lock the organ chamber in one or other of a first rotational position, and a second rotational position disposed at an angle of about 90° relative to the first position. In this way the organ chamber can be rotationally locked in place in multiple positions which may be advantageous during e.g. CT imaging of a heart being perfused.

The heart perfusion system may comprise a single use disposable module and a multiple-use module where, at least the organ chamber and the first flow path form part of the single use disposable module, and wherein the single use disposable module is configured to engage with the multiple-use module for interoperation of the single use module and the multiple use module. In this way it may be possible to provide a system whereby low-cost portions of the system are single-use, e.g. for reasons of sterility, but wherein higher-cost portions of the system are multiple-use.

Components forming part of the single use disposable module may include (but are not limited to) perfusate-contacting component. Accordingly the single use disposable module may comprise: an organ chamber, a first fluid flow path, a perfusate reservoir, a pump interface, and an oxygenator of the heart perfusion system. Components forming part of the multiple-use module may include (but are not limited to): a pump, a chassis, a gas supply source, one or more sensors and a monitor of the heart perfusion system.

Any perfusate suitable for extracorporeal perfusion of a heart may be used in the methods and systems according to the present invention. The perfusate may be blood product based (i.e. the perfusate may comprise one or more blood products, for example red blood cells which carry oxygen). Alternatively or additionally, the perfusate may comprise a synthetic blood substitute. In some cases, the perfusate may comprise a mixture of a blood product and a synthetic blood substitute.

The invention includes the combination of the aspects and preferred features described except where such a combination is clearly impermissible or expressly avoided. In particular, features discussed in relation to the system of the second aspect may also be applicable to the method of the first aspect, in particular insofar as they relate to how a system according to the second aspect of the invention may be configured to perform a method according to the first aspect of the invention.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
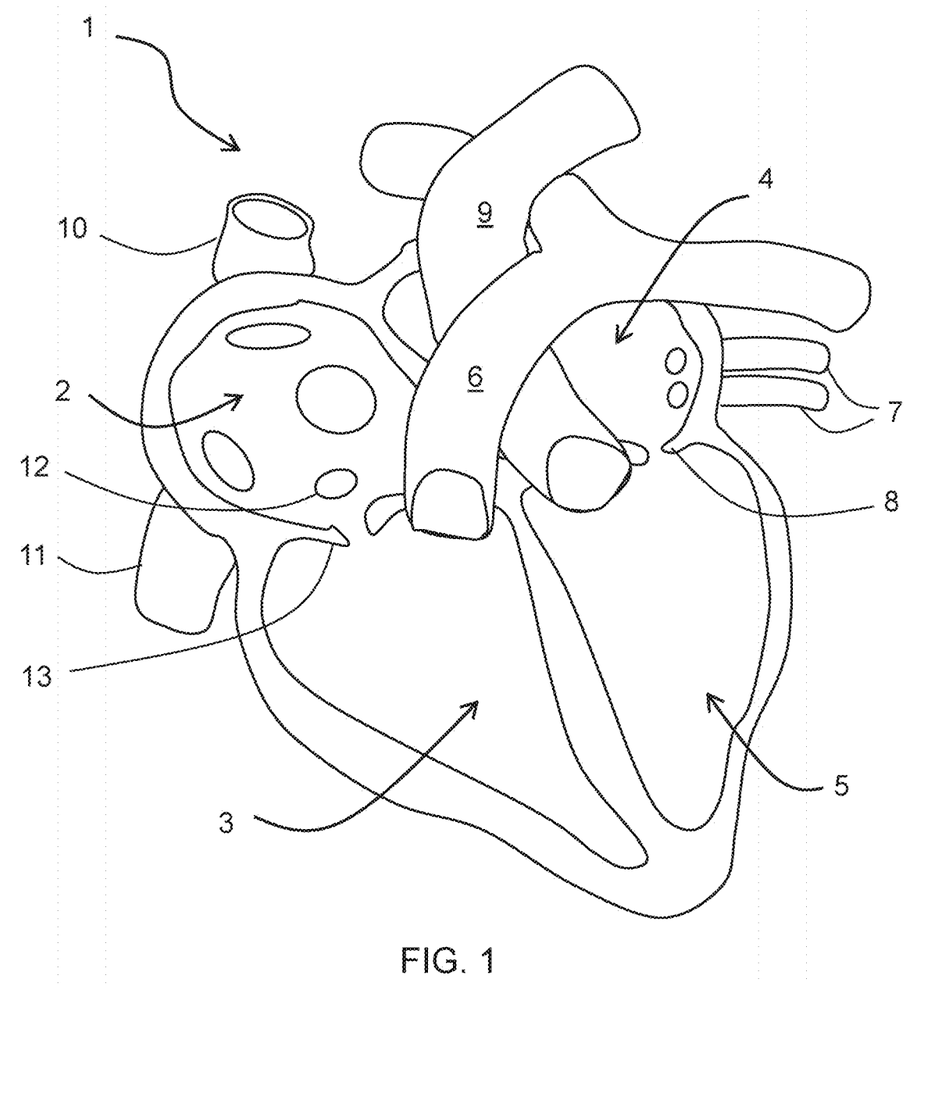
FIG. 1 is a schematic (simplified) drawing of a heart.

The basic anatomy of a heart 1 will be briefly described in relation to FIG. 1. The heart 1 comprises four chambers, two (right atrium 2 and right ventricle 3) on the right side of the heart, and two (left atrium 4 and left ventricle 5) on the left side of the heart. During normal function of a heart in-vivo, blood enters the heart via the atria, and is pumped out by the ventricles. The right side of the heart pumps deoxygenated (venous) blood from the right ventricle 3 to the lungs, via the pulmonary artery 6. Blood passes through the lungs, where it is oxygenated, before returning to the heart via the pulmonary veins 7. The oxygenated blood enters the left atrium 4 of the heart, passes through the mitral valve 8 into the left ventricle 5, whereby it is pumped out of the heart via the aorta 9 to supply the body with oxygenated blood. Deoxygenated blood returns to the right atrium 2 of the heart via the superior vena cava 10, the inferior vena cava 11 and the coronary sinus 12, whereby it passes through the tricuspid valve 13 into the right ventricle 3.

Figure 2:
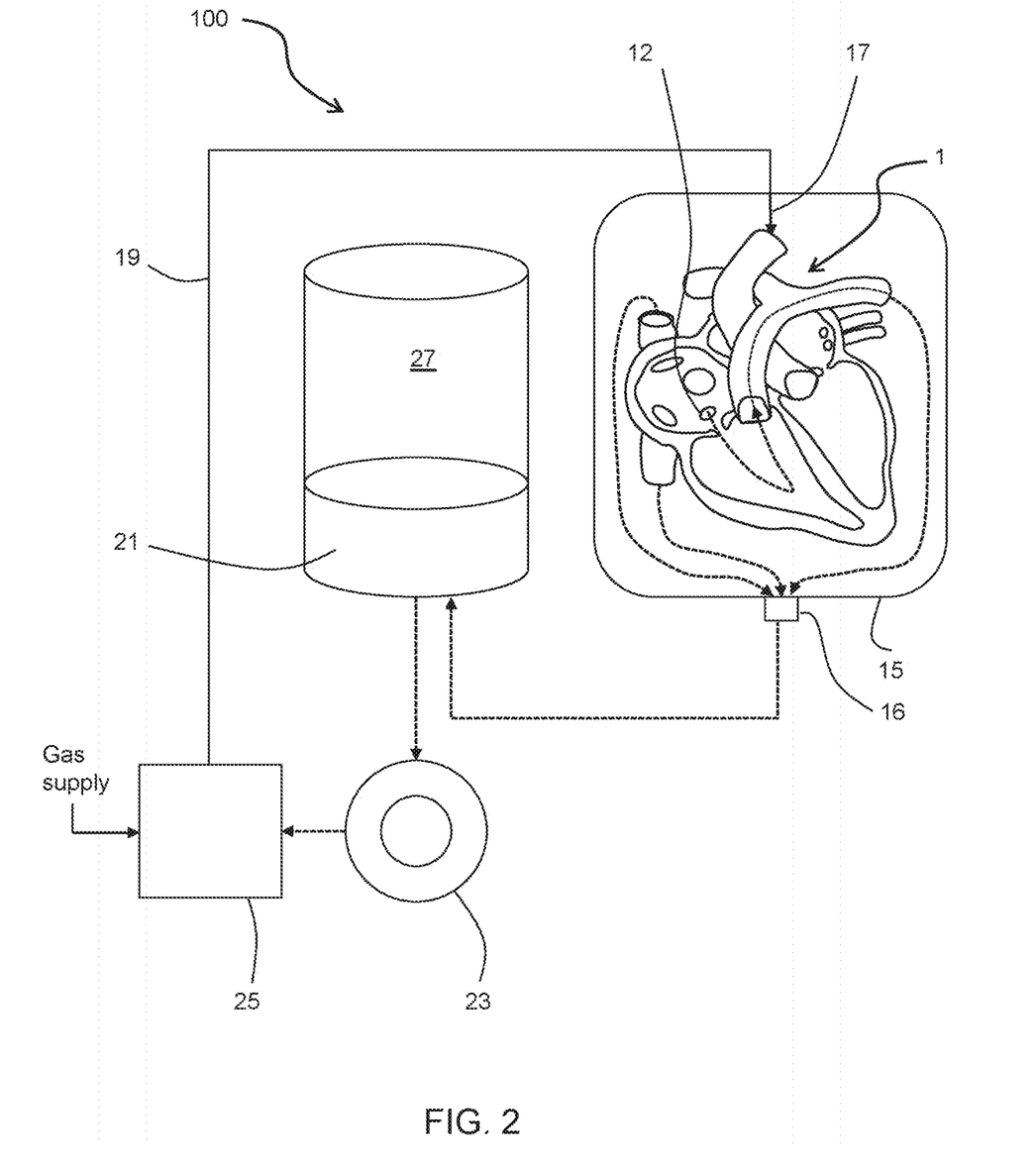
FIG. 2 is a schematic drawing showing a heart perfusion system according to the invention.

FIG. 2 is a schematic drawing showing a heart perfusion system 100 according to one embodiment of the invention. The system comprises an organ chamber 15 configured for containing a heart. Further details of the organ chamber will be discussed below in relation to FIG. 5. The organ chamber 15 comprises an aortic connector 17 for connection to an aorta of the heart. Further features of the aortic connector are discussed below in relation to FIG. 6. The aortic connector is not shown in FIG. 2, however its location is clearly indicated: the aortic connector is an inlet to the organ chamber. The organ chamber 15 further comprises an outlet 16.

The heart perfusion system 100 comprises a first fluid flow path 19, along which, in use, perfusate 21 flows, as indicated by arrows in FIG. 2. At least portions of the first fluid flow path may be defined by ducting arranged to allow perfusate to flow through said ducting. The first fluid flow path comprises a pump interface 23 which is arranged to, in use, transfer a pumping force from a pump to pump venous perfusate around the first fluid flow path. In preferred arrangements, the pump is a centrifugal pump. For example, one pump suitable for use in the present system is the Medos Deltastream™ centrifugal pump. This pump comprises a pump head (or 'pump interface' as described in relation to the present invention) and a pump body. The pump head comprises a housing having an approximately conical inlet portion, a main body, and an outlet. The main body of the housing contains a rotor portion (impeller) of the centrifugal pump, which is magnetically driven. The outlet of the housing is disposed at about 90-100° relative to the inlet of the housing. Perfusate enters the pump head via the conical inlet, whereby a pumping force is translated to the perfusion fluid via the impeller, to thereby pump the perfusion fluid out of the pump head via the outlet, and onwardly around the first fluid flow path to the organ chamber assembly.

The first fluid flow path further comprises an oxygenator 25 configured to oxygenate perfusate passing through the oxygenator. The oxygenator 25 is disposed downstream of the pump interface 23 on the first fluid flow path, such that the pump interface pumps perfusate via the oxygenator to thereby provide subsequent flow of oxygenated perfusate to the heart via the aortic connector 17 of the organ chamber. Due to this arrangement, the perfusion system is configured such that the system is not reliant on normal loading of one or more of the ventricles of heart to pump venous perfusate to the oxygenator, in other words, the system is configured to perfuse the heart in a substantially unloaded state.

The first fluid flow path further comprises a perfusate reservoir 27 for holding a volume of perfusate 21. In typical arrangements the perfusate reservoir 27 is configured to hold a reservoir volume of between 200 ml and 2000 ml of perfusate. The perfusate reservoir is disposed intermediate the organ chamber 15 and the pump interface 23 on the first fluid flow path 19.

The first fluid flow path 19 can be divided into a deoxygenated flow portion, and an oxygenated flow portion. The deoxygenated flow portion is indicated in FIG. 2 by dashed arrows, and is a portion defined downstream of the organ chamber and upstream of the oxygenator on the first fluid flow path. The oxygenated flow portion is indicated in FIG. 2 by solid arrows, and is defined downstream of the oxygenator and upstream of the organ chamber on the first fluid flow path. Accordingly, in this arrangement, the reservoir and pump interface form part of the deoxygenated flow portion of the first fluid flow path 19.

In use, a heart 1 is positioned in the organ chamber 15 and fluidly connected to the first fluid flow path 19 of the heart perfusion system 100 by connection of the aorta 9 of the heart to the aortic connector 17 of the organ chamber. The aorta may be attached by suturing the aorta 9 of the heart to attachment points of the aortic connector, as discussed below in relation to FIG. 6. Oxygenated perfusate is flowed into the heart via the aorta, whereby the heart muscle is perfused via the coronary vasculature of the heart (not pictured). Venous/deoxygenated perfusate then flows into the right atrium 2 of the heart 1 via the coronary sinus 12. Perfusate is allowed to exit the heart via one or more of the inferior vena cava (IVC) and the superior vena cava (SVC)—here by leaving the IVC and SVC unsutured during perfusion. In this way, deoxygenated perfusate can drain directly from the right atrium 2 via the IVC or SVC, as indicated by arrows in FIG. 2. According there is significantly reduced flow into the right ventricle during perfusion in comparison to known perfusion arrangements. However, some perfusate may pass into the right ventricle 3, whereby it is allowed to exit the heart via the pulmonary artery 6, as indicated by a further arrow in FIG. 2. Here, perfusate from the IVC, SVC and pulmonary artery vents directly into the organ chamber 15. Perfusate can exit the organ chamber 15 via outlet 16, which is fluidly connected to the perfusate reservoir 27. With this arrangement, it is possible to perfuse a heart without provision of complicated venting arrangements for directing perfusate.

Figure 3:
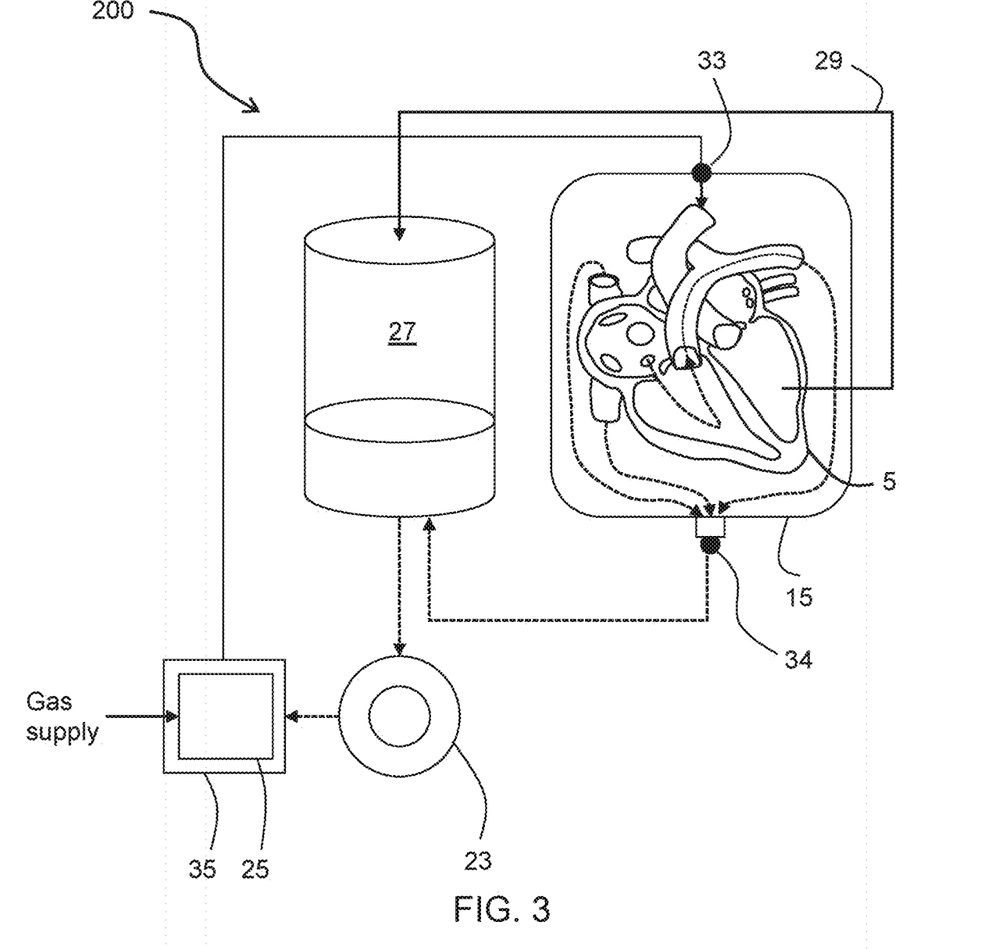
FIG. 3 is a schematic drawing showing a heart perfusion system according to the invention, the heart perfusion system comprising a left ventricle venting arrangement.
Figure 4:
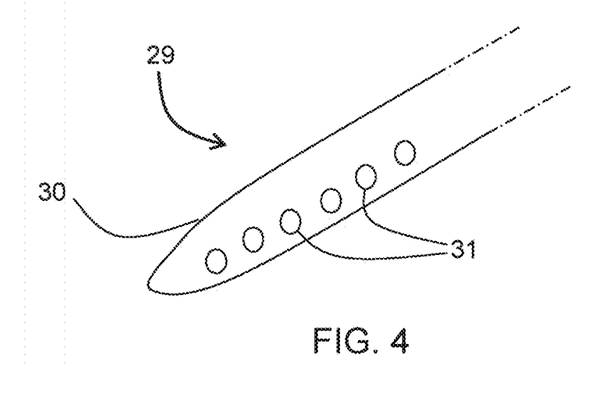
FIG. 4 is a schematic drawing of part of the left ventricle venting system shown in FIG. 3.

In some systems, a left ventricle venting arrangement is provided. A system comprising a left ventricle venting arrangement is shown in FIG. 3. Here, a duct 29 is located within the left ventricle 5 of the heart (e.g. by being arranged to pass through the left atrial appendage into the left ventricle via the mitral valve) to thereby vent perfusate from the left ventricle. Venting the left ventricle can help to prevent distention and/or injury of the left ventricle during perfusion. FIG. 4 shows a tip portion 30 of the duct 29. The duct comprises a plurality of perforations 31 along the length of the duct to thereby allow perfusate to enter the duct at multiple locations. In the arrangement shown in FIG. 3, the left ventricle venting arrangement is configured to direct the perfusate vented from the left ventricle to the perfusate reservoir 27 of the heart perfusion system. In other words, the perfusate is not vented directly into the organ chamber 15. Instead, the left ventricle venting arrangement provides a second fluid flow path which bypasses the organ chamber. Perfusate vented from the left side of the heart via the left ventricle will typically be oxygenated perfusate which has entered the left side of the heart via a trickle flow from the aorta. Accordingly by directing this vented oxygenated perfusate to bypass the organ chamber, whilst venous perfusate is vented directly into the organ chamber, it is possible to measure the myocardial oxygen consumption sufficiently accurately, by providing a first oxygen saturation sensor 33 at the inlet 17 to the organ chamber which is arranged to measure oxygen saturation of oxygenated perfusate entering the aorta of the heart, and a second oxygen saturation sensor 34 at the outlet 16 of the organ chamber arranged to measure oxygen saturation of venous perfusate exiting the right side (right atrium and/or right ventricle) of the heart. The myocardial oxygen consumption can be calculated by comparing an output of the first oxygen saturation sensor and an output of the second oxygen saturation sensor.

The arrangement shown in FIG. 3 further comprises temperature regulation means arranged to regulate the temperature of perfusate within the first fluid flow path. Here, the temperature regulation means is conveniently provided in the form of a heat exchanger 35 operable to regulate the temperature of perfusate within the oxygenator 25. A jacket is fitted around the oxygenator, and a heated/cooled fluid is passed through the jacket, whereby heat exchanges with the perfusate such that the temperature of perfusate within the first fluid flow path is regulated. In preferred arrangements, the temperature of the perfusate is regulated to be in a range of below 34° C. to keep the metabolic rate of the heart suitably low during perfusion.

Figure 5:
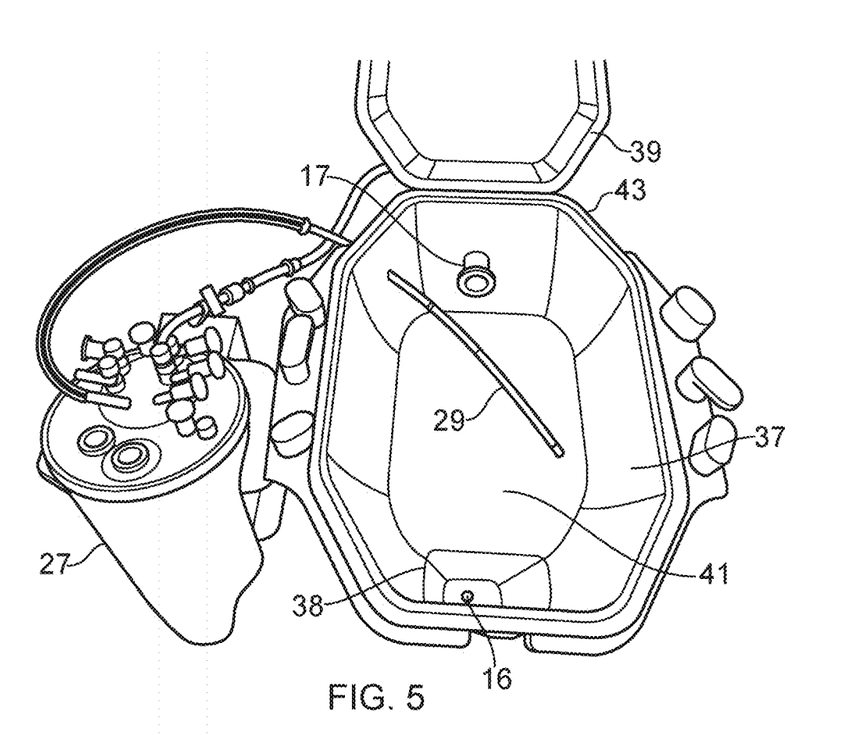
FIG. 5 is an image showing a portion of a heart perfusion system according to the invention.

FIG. 5 shows the organ chamber 15 in more detail. The organ chamber comprises a housing 37 and a lid 39. The housing comprises a floor 41, upon which the heart is supported in use, and a perimeter wall 43 upstanding from the floor, and thereby defining an opening via which the heart can be disposed in the housing. When shut, the lid 39 covers substantially the entire opening of the housing. The organ chamber has dimensions of approximately L345 mm×H233 mm×W215 mm, and may be conveniently produced by any suitable method including e.g. 3D printing or injection moulding. The material of the organ chamber is contact-biocompatible—conveniently it is made from Tritan™ plastic, although a wide range of other materials may be suitable. The aortic connecter 17 (shown in more detail in FIG. 6) provides an inlet to the organ chamber. The outlet 16 of the organ chamber is disposed within a well portion 38 defined by the floor of the organ chamber (an increased depth portion of the organ chamber)—this is also shown more clearly in FIG. 9. Perfusate vented into the organ chamber will collect in the well portion, whereby it can flow out of the organ chamber via the outlet 16.

A left ventricle venting arrangement is provided in the form of a duct 29 disposed within the organ chamber, configured for location in the left ventricle of the heart during perfusion. The duct is arranged to pass through the wall 43 of the organ chamber, to avoid obstructing the lid of the organ chamber. The duct is arranged to direct vented fluid to the reservoir 27.

Figure 6:
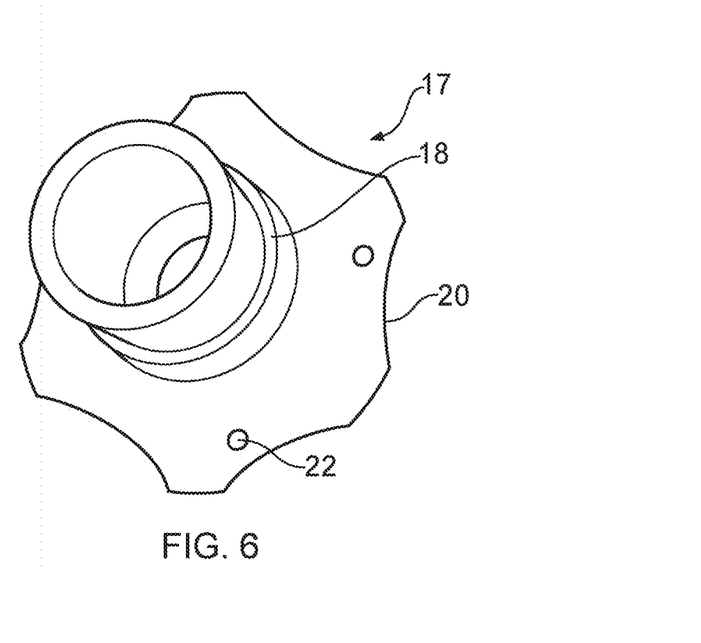
FIG. 6 is an image showing an aortic connector of a heart perfusion system according to the invention.

As shown in FIG. 6, the aortic connector 17 comprises a tube portion 18 and a collar portion 20. A plurality of attachment points are provided in the form of through-holes 22 on the collar portion. The aorta of the heart being perfused can be attached to the aortic connector by suture passing through both the aorta and through the through-holes 22. This can help to prevent the heart from falling off of the aortic connector during perfusion. As there are a plurality of through-holes disposed at approximately equal intervals about a circumference of the aortic connector, the heart can be attached to the connector by sutures disposed at approximately equal intervals about the aorta of the heart. This can provide for more even distribution of force about the circumference of the aorta of the heart when attached to the aortic connector.

Figure 7:
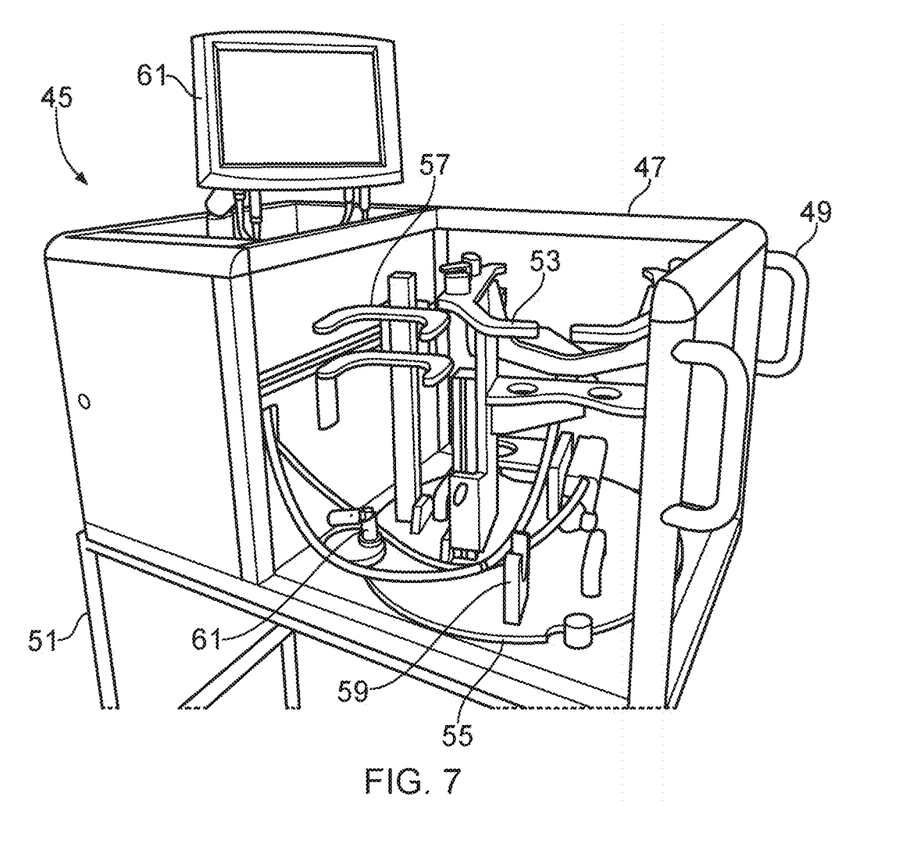
FIG. 7 is an image showing a heart perfusion system according to the invention.

FIG. 7 shows a perspective view of the heart perfusion system including a chassis 45 of the heart perfusion system. The chassis comprises a frame structure 47 to which other components of the heart perfusion system may be attached or on which other components of the heart perfusion system may be supported. The chassis comprises two pairs of handles 49 respectively attached at opposite ends of the frame structure of the chassis. The chassis is here supported on a wheeled base 51 for ease of transportation. The chassis further supports a monitor 63 which is configured to display output information of one or more sensors of the heart perfusion system, for example, oxygen saturation sensors, pressure sensors, temperature sensors, flow rate sensors, oxygen saturation sensors and/or haematocrit sensors (not shown). This can assist an operator in monitoring operation of the system during perfusion.

Figure 9:
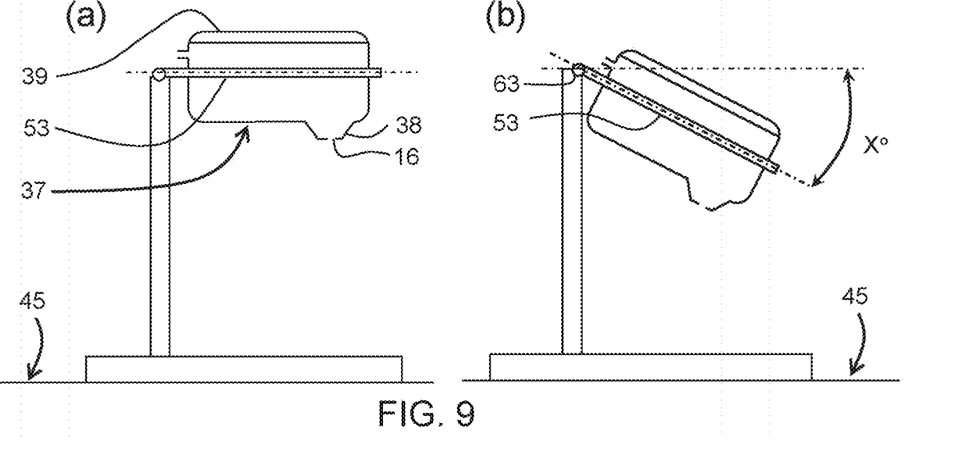
FIG. 9 is a schematic drawing showing (a) the organ chamber in a first (horizontal) position and (b) a second (tilted) position.

The chassis comprises an organ chamber support member 53 configured to support the organ chamber 15. Here, the organ chamber support member 53 is conveniently formed as a cradle into which the organ chamber housing 37 can be fitted. The organ chamber support member is pivotable relative to the chassis to thereby allow movement of the organ chamber between a first position, in which the organ chamber is configured to hold a heart in a substantially horizontal position, and a second position in which the organ chamber is configured to hold a heart in tilted position. FIG. 9 is a schematic drawing showing (a) the organ chamber in the first position (in a horizontal plane, indicated by a dashed line) and (b) the second position, where the organ chamber is tilted at an angle of X° relative to the horizontal plane, as measured along a longitudinal axis of the organ chamber, also indicated by a dashed line. This pivotability is achieved by attaching the organ chamber support member to the chassis via a pivotable hinge, 63.

Figure 8:
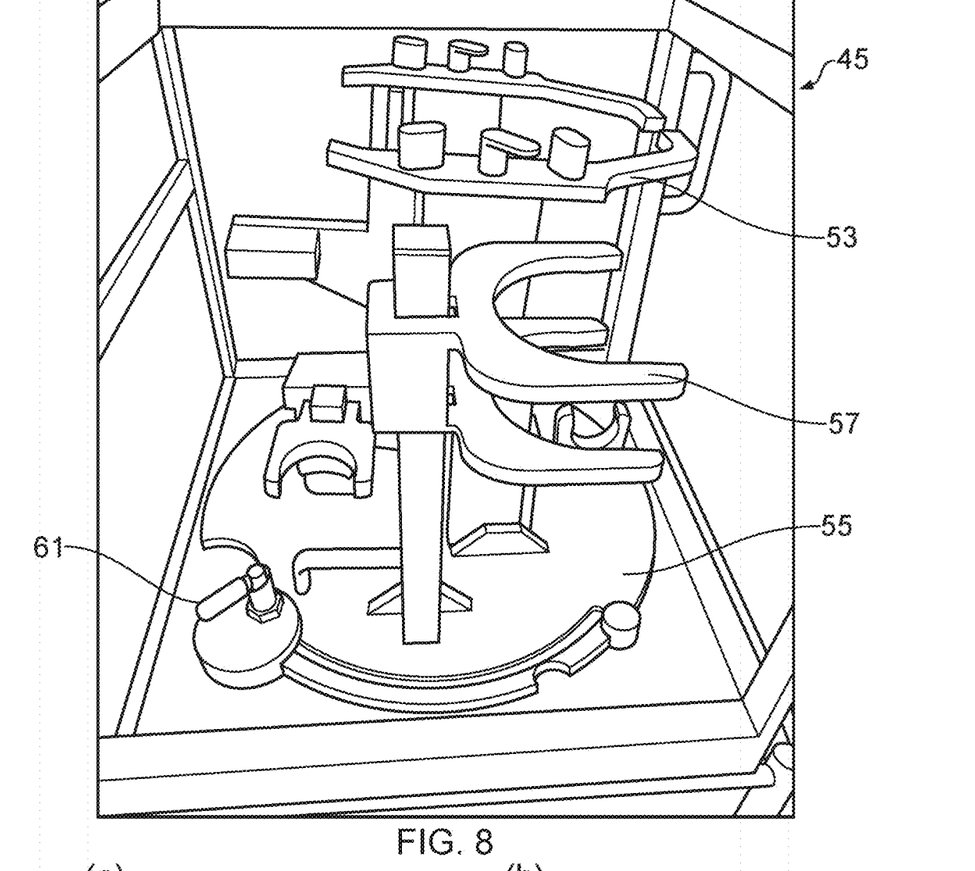
FIG. 8 is an image showing a portion of a heart perfusion system according to the invention.

The organ chamber support member 53 is also rotatable relative to the chassis as it is disposed on a platform 55 rotatably fixed to the chassis, shown most clearly in FIGS. 7 and 8. The platform is rotatable in a horizontal plane by 90° with respect to the chassis, between a first rotational position (shown in FIG. 7) and a second rotational position (shown in FIG. 8). This is particularly advantageous for performing CT coronary angiography of a heart being perfused in the heart perfusion system, because it is possible to obtain different views of the heart without removing the heart perfusion system from the CT machine.

The chassis further comprises a reservoir support member 57 and a pump support member 59 which are also disposed on the rotatable platform 55. In this way, the organ chamber, the perfusate reservoir and the pump can be simultaneously rotated with respect to the chassis. This can help to avoid entanglement of different components of the heart perfusion system as the platform 55 is rotated with respect to the chassis.

A locking member 61 is provided on the chassis configured to lock the rotatable platform in one or other of the first and second rotational positions. This is beneficial to prevent unwanted movement of the rotatable platform during perfusion. Here, the locking member is conveniently provided as a spring-biased pin arranged to interlock with one or more locating holes or recesses formed in the rotatable platform. However, a wide range of alternative locking systems are contemplated.

The heart perfusion system shown and discussed in relation to FIG. 3-9 comprises a single use disposable module and a multiple-use module. The single-use disposable module includes the organ chamber 15, the ducting which forms path of the first fluid flow path 19, the perfusate reservoir 27, the pump interface 23, the oxygenator 25 and the left ventricle venting arrangement. In other words, all perfusate-contacting components of the heart perfusion system.

Components forming part of the multiple-use module include (but are not limited to) the pump, the chassis 45 (including frame 47, organ chamber support member 53, platform 55, reservoir support member 57, pump support member 59 etc.) the gas supply source, sensors and the monitor 61 of the heart perfusion system.

In this way it may be possible to provide a system whereby low-cost portions of the system are single-use, e.g. for reasons of sterility, but wherein higher-cost portions of the system are multiple-use. The system may be provided as a kit which includes a single multiple-use module, and a plurality of single use disposable modules.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A method of extracorporeal perfusion of a heart, the method comprising steps of:
    providing a heart perfusion system comprising an organ chamber having an aortic connector, and a first fluid flow path comprising a pump interface and an oxygenator, the aortic connector being fluidly connected to the first fluid flow path;
    providing a left ventricle venting arrangement comprising one or more ducts;
    placing the heart within the organ chamber, attaching an aorta of the heart to the aortic connector, and locating one or more ducts of the left ventricle venting arrangement within the left ventricle of the heart to vent perfusate from the left ventricle;
    providing a pump to transfer pumping force to the pump interface to pump venous perfusate within the first fluid flow path via the oxygenator to thereby provide subsequent flow of oxygenated perfusate to the heart via the aortic connector; and
    allowing perfusate to exit the heart via one or more of the inferior vena cava and the superior vena cava to thereby perfuse the heart in a substantially unloaded state.

2. The method according to claim 1 including a step of directing the vented perfusate to a perfusate reservoir of the heart perfusion system.

3. The method according to claim 1 wherein the perfusate is at a temperature of between about 4° C. and about 34° C.

4. The method according to claim 1 wherein the perfusate is pumped at a constant pressure between about 30 and 100 mmHg.

5. The method according to claim 4 wherein the pump is a centrifugal pump.

6. The method according to claim 1 where the perfusate is supplied to the aorta of the heart at a volume rate of about 75 mls/min to about 1300 mls/min.

7. The method according to claim 1 wherein the perfusate is oxygenated using a gaseous mix of about 95% air to about 5% carbon dioxide.

8. The method according to claim 1 wherein the method includes further steps of monitoring a vascular resistance index of the heart.

9. The method according to claim 1 wherein the method includes further step of monitoring myocardial oxygen consumption of the heart.

* * * * *